G. G. EARL.
HYDRAULIC SYSTEM OR FLUID REGULATING DEVICE.
APPLICATION FILED JUNE 7, 1915.
1,178,222.
Patented Apr. 4, 1916.
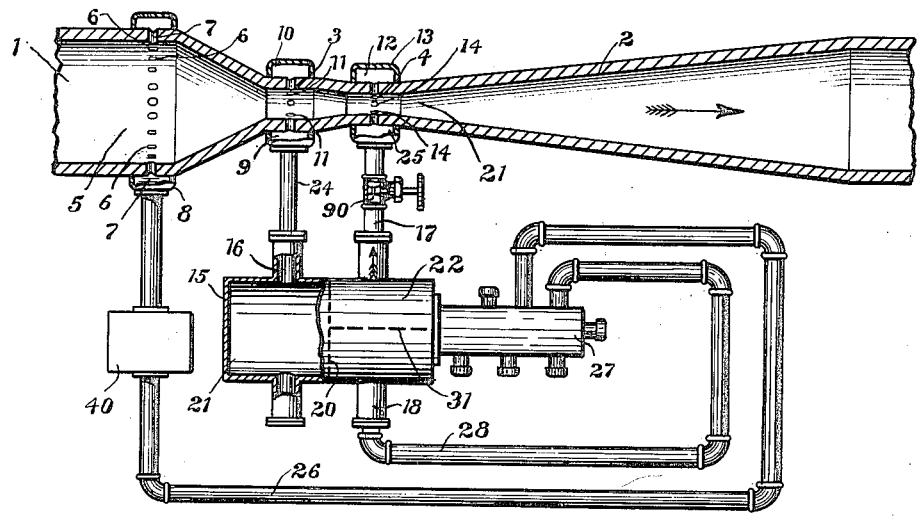
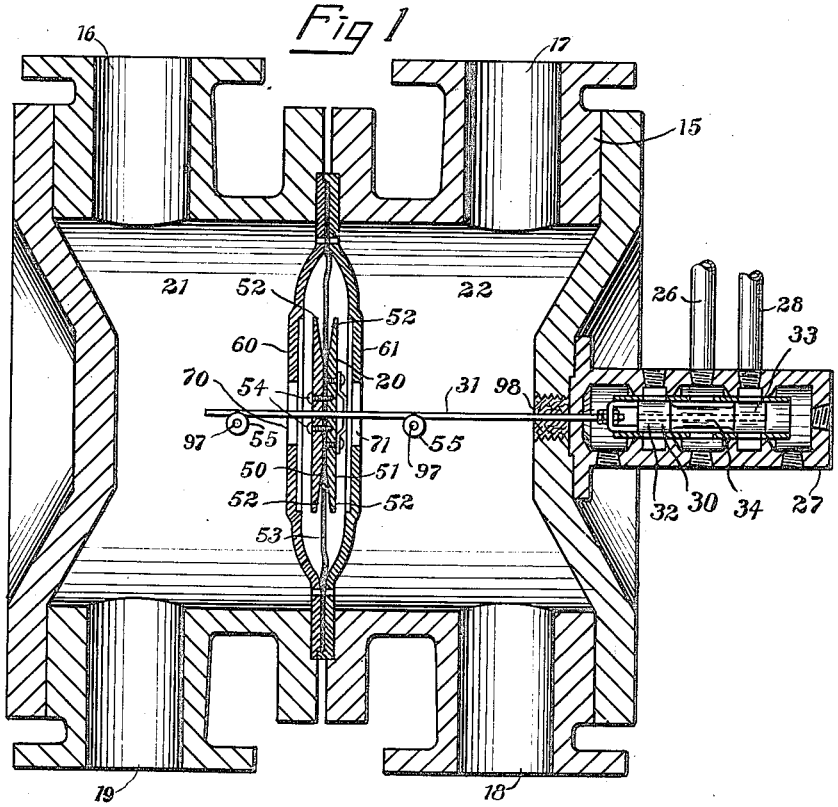
INVENTOR.
George G. Earl
BY
ATTORNEY

UNITED STATES PATENT OFFICE.

GEORGE GOODELL EARL, OF NEW ORLEANS, LOUISIANA.

HYDRAULIC SYSTEM OR FLUID-REGULATING DEVICE.

1,178,222.  Specification of Letters Patent.  Patented Apr. 4, 1916.

Application filed June 7, 1915. Serial No. 32,726.

*To all whom it may concern:*

Be it known that I, GEORGE G. EARL, a citizen of the United States, residing at New Orleans, in the parish of Orleans and State of Louisiana, have invented certain new and useful Improvements in Hydraulic Systems or Fluid-Regulating Devices; and I do hereby declare the following to be a full, clear, and exact description of the invention, such as will enable others skilled in the art to which it appertains to make and use the same.

My invention relates to fluid regulating devices or hydraulic systems, and has for one of its objects the withdrawal from some fluid source, such as a main conduit, of a proportional part of the fluid flowing through said conduit and for employing the same for some useful purpose, such as the actuation of some fluid responsive device.

Other objects of my invention and the invention itself will probably be better understood from a description of an embodiment thereof.

Figure 1 shows in section apparatus embodying my invention which will serve the purpose of describing the said invention. Fig. 2 is a section through the pressure chamber and valve casing shown in Fig. 1, showing the mechanical details of the preferred form of my invention.

Referring now to the drawing and to the embodiment of the invention illustrated therein, at 1 is shown a source of fluid pressure, such as a main conduit, through which fluid flows under pressures created by a source, such as a reservoir, above the elevation of the section of the conduit illustrated, all of which is well understood and not shown. Suitable means are provided for creating at different points different pressures in the conduit.

In the embodiment illustrated, a Venturi tube is shown at 2, which is provided with a plurality of throats 3 and 4. I have shown two throats of different size, being here shown of different area and arranged in sequence. It is assumed that the fluid flows through the conduit in the direction of the arrow. The conduit is also provided with a section 5, constituting an approach to the venturi 2. Means are provided for tapping the conduit at the approach and at each of the throats. At the approach a number of small openings 6 are shown, which lead into a small chamber 7 formed by a casing 8. This chamber may extend all the way around the conduit. At the throat 3 a chamber 9 may be formed in the same manner by a casing 10 and a plurality of openings 11 lead through the walls of the conduit. A chamber 12 may be formed about the throat 4 in the same manner by a casing 13. A number of openings 14 are formed in the walls of the conduit leading into this chamber.

A pressure chamber is shown at 15 provided with a plurality of openings 16, 17, 18 and 19 in the walls thereof. Movable means 20 is inclosed within this chamber, here shown as a flexible diaphragm, which may be considered as dividing the chamber into two cells 21 and 22. Means are provided for transmitting the effect of the fluid pressure from the throats of the venturi to either side of the means 20. For example, a duct 24 connected to the chamber 9 leads to the cell 21 and a duct 25 connected to the chamber 12 leads to the cell 22. Means are also provided for conveying a different fluid pressure to the cell 22, here shown as a duct 26 connected to the chamber 7 at the approach 5, through a valve casing 27 and a second section of the duct 28 to the cell 22, through the opening 18. A valve 30 is in the valve casing. This valve is controlled by the movable means 20 through a rod 31 connected to the valve. I prefer to use a spool-shaped valve whose heads are illustrated at 32 and 33, and whose shank is illustrated at 34. A fluid responsive device is connected in the path of the fluid flowing through the valve. In the form shown I have connected a meter 40 in the duct 26. A restriction, here shown as an orifice 90, is placed in the duct 17.

In the form illustrated the member 20 consists of two plates 50 and 51 beveled off at 52. The plates are connected upon opposite sides of a diaphragm 53, which is very flexible, permitting a free and unrestrained movement of the plates 50 and 51, and at the same time consisting of a fluid-tight division between the cells 21 and 22. As stated, the plates are beveled at 52 to permit them to move through a sufficient range without catching the diaphragm 53. The plates and diaphragm are connected together by any suitable means, such as screws 54. The rod 31 may, as shown, pass through both the plates and the diaphragm and may be supported by friction reducing means, here shown as rollers 55, which may be supported from the casing in any suitable manner. These rollers relieve the diaphragm of the weight of the plates and enable the same to be moved without causing any strain upon the diaphragm, or without causing any of the pressure applied to the plates to be expended through the edges of the diaphragm to the chamber walls. The rod 31 may be surrounded by packing 98 where it enters the valve casing 27.

I may also provide guards 60 and 61 for the protection of the diaphragm and the plates, such guards being provided with openings 70 and 71 through which the rod 31 passes.

Perhaps my invention will be better understood from a description of the operation of the embodiment of the invention illustrated. When there is no flow of fluid through the conduit, the valve will be in the position illustrated in the drawing, and there will consequently be no flow of fluid through the duct 26 or the meter 40. In fact, only the static pressure in the main will be conveyed to the two sides of the member 20, so that the same will be in equilibrium. If fluid begins to flow in this main, the pressure in the cell 21 will increase over the pressure in the cell 22, because of the different sizes of the throats of the venturi to which the cells are connected; the throat 3 being greater, the pressure in 21 will increase over that in 22. This will cause the diaphragm 20 to move toward the right with the valve 34, opening the same and permitting a flow of fluid through the duct 26, the valve and the section 28 of the duct 26, into the cell 22, through the orifice 90 and back to the main. The resistance to flow offered by the orifice 90 will enable the pressure in cell 22 to be built up to a point where it will equal the pressure in cell 21. The opening of the valve will also admit to the cell 22 the effects of the fluid pressure at the approach 5, and as will be seen, the valve will continue to open until this additional pressure causes a balance of the member 20. The fluid flowing through the duct 26 will operate the meter 40, and as will be seen, will be proportional to the flow through the main. Each time the flow increases, this action will take place, increasing in proportion the flow through the duct 26, and always bringing the member 20 to balance and maintaining it there as long as the flow is constant.

When the flow in the main decreases, the reversed action will take place, the pressure in the cell 21 dropping and the valve being moved in a position to cause a decrease in the flow through the duct 26. This will continue until the member 20 is balanced, the flow through the duct 26 being always maintained proportional to the flow through the main 1.

It will be readily understood that the duct 26 may be connected to any suitable portion of the main, or in fact, to any suitable source of fluid pressure and any suitable means may be employed for securing from the main the desired fluid pressures for the operation of the device. Any suitable means may be employed at 20, and any one of a number of well known forms of valves may be employed at 27. In fact, I have illustrated this particular form and these details of my invention for the purpose of describing the invention and not that I wish to be limited to such form and details, as it will be apparent to those skilled in the art that many departures may be made from the same without departing from the spirit of the invention.

I claim:—

1. In a hydraulic system, the combination of a main conduit having fluid flowing therethrough under pressure, said conduit including a Venturi tube provided with a plurality of throats of different areas, a different fluid pressure being created at each throat, a fluid pressure chamber, a movable member in said chamber dividing it into two cells, a duct connecting one of said cells with the conduit at one of said throats, a second duct connecting the other of said cells with said conduit at the other of said throats, said conduit being provided with an approach to said venturi, a third duct connecting said approach to one of said cells and means controlled by the movable member for maintaining the pressure in one of said cells equal to that in the other of said cells.

2. In a hydraulic system, the combination of a main conduit through which fluid may flow under pressure, said conduit including a Venturi tube provided with two throats of different areas, the fluid pressure at each throat being different from the fluid pressure at the other, a fluid pressure chamber, a movable member in said chamber, a duct connecting one of said throats to said chamber on one side of said member, a second duct connecting the other throat on the other side of said member, said conduit being provided with an approach to said venturi, a third duct connecting said approach to said chamber and mechanism including a valve controlled by said movable member for regulating the flow of fluid through said third conduit.

3. In a hydraulic system, the combination of a main conduit through which fluid may flow under pressure, said conduit including a Venturi tube provided with two throats of different areas, the fluid pressure at each throat being different from the fluid pressure at the other, a fluid pressure chamber, a movable member in said chamber, a duct connecting one of said throats to said chamber on one side of said member, a second duct connecting the other throat to the other side of said member, said conduit being provided with an approach to said venturi, a third duct connecting said approach to said chamber and mechanism including a valve in the third duct governed by the movable member for maintaining the pressure on one side of said member equal to the pressure on the other side thereof.

4. In a hydraulic system, the combination of a main conduit through which fluid may flow under pressure, said conduit including a Venturi tube provided with a plurality of differently dimensioned throats, the fluid pressures at the throats being different, said conduit being provided with an approach to said venturi, a duct connected to said approach and adapted to convey fluid and mechanism controlled by the pressures at said throats for regulating the flow through said duct.

5. In a hydraulic system, the combination of a main conduit through which fluid may flow, said conduit including a Venturi tube provided with a pair of differently dimensioned throats, different fluid pressures being created at the different throats, a pressure chamber, a movable member in said chamber dividing it into two cells, a duct connecting one of said cells to one of said throats and transmitting the effects of the pressure at said throat to said cell, a third source of pressure, ducts connecting said third source and said other throat to the second cell and affecting the pressure therein and mechanism controlled by said movable member for maintaining the pressures in said cells equal.

6. In a hydraulic system, the combination of a main conduit through which fluid may flow under pressure, said conduit including a Venturi tube provided with a pair of differently sized throats, the pressures at the throats being different, a pressure chamber, a third source of pressure, a movable member in said chamber, means to transmit the effects of the fluid pressure at one of the throats to the chamber on one side of said member, means to transmit the effects of the fluid pressures at the other throat and from the third source to the chamber on the other side of the movable member and mechanism including a valve controlled by said movable member for maintaining the pressure on one side of said member equal to the pressure on the other side.

7. In a hydraulic system, the combination of a main conduit provided with sections of different areas, different pressures being set up at the sections of different areas, a fluid chamber, a movable member in said chamber, means connecting one of said sections of the conduit to the chamber on one side of said member, means to connect the other of said sections of the conduit to said chamber on the other side of said member, said means transmitting the effects of the pressure in the conduit at said sections to said movable member and mechanism controlled by said movable member for maintaining the pressure on one side of said member equal to the pressure on the other side.

8. In a fluid regulating system, the combination of a main conduit through which fluid may flow under pressure, a fluid chamber, a fluid-tight division therein dividing said pressure chamber into two pressure cells, said division adapted to move freely through a finite range of motion from the greater to the lesser fluid pressures in the two cells, so long as any finite difference exists between the pressures in said cells, means to apply to one of said cells a varying fluid pressure, a source of higher fluid pressure consisting of a section of said conduit and an outlet of lower fluid pressure than said varying fluid pressure, a fluid passage-way from said source to said outlet, a connection from said passage-way to the other of said fluid pressure cells, and means including a valve in said passage-way operated by the movable division to govern the flow of fluid from said source to said outlet and thereby maintain the static fluid pressure in the second named cell equal to the varying static fluid pressure in the first named cell.

9. In a fluid regulating system, the combination of a fluid pressure chamber, a fluid-tight movable member therein, a main conduit having fluid therein under pressure, means to transmit different fluid pressures from said conduit to said chamber, one to one side of said member and another to the other side of said member, a third means to transmit a third fluid pressure from said conduit to said chamber on one side of said member and mechanism including a valve controlled by said movable member for maintaining the pressure on one side of said member equal to the pressure on the other side.

10. In a fluid regulating system, the combination of a main conduit through which fluid flows under pressure for creating a plurality of sources of fluid pressure therein, a pressure chamber, a movable diaphragm dividing said pressure chamber into two cells, means to transmit the effect of the fluid pressure from said sources to one of said cells whereby one of said pressures acts upon one side of said diaphragm, means for hydraulically transmitting the effects of fluid pressures from a plurality of said sources to the other of said cells, whereby the other side of the diaphragm is acted upon thereby and means including a valve controlled by said diaphragm for maintaining the pressure in one of said cells equal to the pressure in the other of said cells.

11. In a hydraulic system, the combination of a main conduit having fluid flowing therethrough under pressure, said conduit including a Venturi tube having a plurality of throats of different size, different fluid pressure being created at the different throats by the flow of fluid in the conduit, said conduit being provided with an approach to said venturi, a duct connected to the conduit at said approach adapted to convey a flow of fluid and means for regulating the flow of fluid through said duct including movable mechanism and means for transmitting the effects of the fluid pressure at each of said Venturi throats to said movable mechanism.

12. In a hydraulic system, the combination of a main conduit provided with an approach and having fluid flowing therethrough under pressure, said conduit including a Venturi tube having a plurality of throats of different sizes, different fluid pressures being created at the different throats by the flow in the conduit, a pressure chamber, movable means affected by the pressure in said chamber, means for transmitting from one of said throats the effects of the pressure thereat to one side of said member, means for transmitting the effects of the fluid pressure at the other of said throats and at said approach to the other side of said movable means and apparatus controlled by said movable means for maintaining the pressures on the two sides equal to each other.

13. In a hydraulic system, the combination of a main conduit having fluid flowing therein, under pressure, said conduit including a Venturi tube having a sequence of throats of different sizes, different fluid pressures being created at said throats by the flow in the conduit, said conduit being provided with an approach to said venturi, two pressure cells, means to transmit the effects of the pressure from one of said throats to one of said cells, means to transmit the effects of the fluid pressures at the other of said throats and at said approach to the other of said cells, movable mechanism effected by the pressures in said cells and apparatus controlled by said movable mechanism for maintaining the pressure in each of said cells equal to the pressure in the other.

14. In a fluid regulating system, the combination of a fluid pressure chamber, a fluid-tight movable member therein, a main conduit having fluid therein under pressure, means to transmit different fluid pressures from said conduit to said chamber to act upon different sides of said movable member, a duct leading from said main to said chamber and transmitting a third fluid pressure from said conduit to said chamber to act upon one side of said member, said duct adapted to convey a fluid flow, and mechanism including a valve controlled by said member for regulating the flow of fluid through said duct.

15. In a hydraulic system, the combination of a fluid main having an approach and two restrictions of different areas in sequence, different fluid pressures being created at said approach and at said restrictions by the flow of fluid through said main, a fluid pressure chamber, a connection from said pressure chamber to the larger of said restrictions communicating the pressure therein to said chamber, another pressure chamber, a duct connecting the approach chamber to said restrictions to said other pressure chamber, a fluid responsive device in said duct, a valve in said duct, a movable member acted upon by the pressures in said pressure chambers to operate said valve and govern the flow through said duct, another fluid passage-way connecting said second named pressure chamber to the smaller of said sequence of restrictions and a restriction in said passage-way adapted to cause a loss of pressure proportional to the square of the volume of flow therethrough.

I have affixed my signature hereunto this 24th day of May, 1915.

GEORGE GOODELL EARL.